United States Patent
Murray (10) Patent No.: US 7,497,025 B2
(45) Date of Patent: Mar. 3, 2009

(54) UNIVERSAL INSTALLATION TEMPLATE AND METHOD OF USE FOR PLACEMENT OF IN-WALL OR IN-CEILING SPEAKERS

(75) Inventor: Jimmy Lee Murray, Concordia, MO (US)

(73) Assignee: Lava Controls LLC, Concordia, MO (US)

( * ) Notice: Subject to any disclaimer, the term of this patent is extended or adjusted under 35 U.S.C. 154(b) by 129 days.

(21) Appl. No.: 11/624,271

(22) Filed: Jan. 18, 2007

(65) Prior Publication Data

US 2007/0169424 A1    Jul. 26, 2007

Related U.S. Application Data

(60) Provisional application No. 60/762,981, filed on Jan. 26, 2006.

(51) Int. Cl.
*E04F 21/00* (2006.01)
(52) U.S. Cl. .................. 33/528; 33/562; 33/DIG. 10
(58) Field of Classification Search ............ 33/1 G, 33/528, 561.1, 561.2, 561.3, 562, 563, 566, 33/613, 645, DIG. 10; 83/745; 174/58, 480; 381/386, 395; 408/115 R
See application file for complete search history.

(56) References Cited

U.S. PATENT DOCUMENTS

| | | | | |
|---|---|---|---|---|
| 152,910 | A * | 7/1874 | Miller | 33/561.3 |
| 1,056,759 | A * | 3/1913 | Mallery | 174/58 |
| 1,612,455 | A * | 12/1926 | McGeorge | 33/528 |
| 2,733,517 | A * | 2/1956 | Gjersoe | 33/666 |
| 4,202,388 | A * | 5/1980 | Wieting | 144/353 |
| 4,359,302 | A * | 11/1982 | Payne | 409/84 |
| 4,388,890 | A * | 6/1983 | Wester et al. | 116/204 |
| 4,662,080 | A * | 5/1987 | Gale | 33/528 |
| 4,778,134 | A * | 10/1988 | Struthers et al. | 248/27.1 |
| 4,802,284 | A * | 2/1989 | Jackson | 33/528 |
| 5,114,105 | A * | 5/1992 | Young | 248/27.1 |
| 5,388,795 | A * | 2/1995 | Struthers et al. | 248/231.9 |
| 5,711,082 | A * | 1/1998 | Olivo | 33/528 |
| 5,931,425 | A * | 8/1999 | Oliva | 248/200.1 |
| 6,220,317 | B1 * | 4/2001 | Martin et al. | 144/372 |
| 6,696,642 | B1 * | 2/2004 | Corwin | 174/50 |
| 6,698,103 | B2 * | 3/2004 | Nortier et al. | 33/645 |
| 6,870,100 | B2 * | 3/2005 | Corwin | 174/58 |
| 6,986,210 | B1 * | 1/2006 | Conway | 33/562 |
| 7,086,171 | B2 * | 8/2006 | Lawson | 33/562 |
| 7,210,241 | B1 * | 5/2007 | Bree | 33/528 |

(Continued)

FOREIGN PATENT DOCUMENTS

GB      2259541 A   *   3/1993

(Continued)

*Primary Examiner*—R. A. Smith
(74) *Attorney, Agent, or Firm*—Husch Blackwell Sanders LLP (57) ABSTRACT

Embodiments of the present invention provide installation templates and methods that allow placement of various sized equipment in a finished wall or ceiling. In one embodiment, a method of forming an aperture for mounting of an in-wall component between two supports is provided. The method generally includes coupling a substrate, including an adjustable guide corresponding to the dimensions of the in-wall component, to the two supports, installing drywall over the substrate and the guide, and forming the aperture by removing at least a portion of the drywall installed over the guide.

20 Claims, 8 Drawing Sheets

U.S. PATENT DOCUMENTS

| | | | |
|---|---|---|---|
| 7,252,463 B2 * | 8/2007 | Valdez | 408/115 R |
| 7,271,335 B2 * | 9/2007 | Dinh | 174/58 |
| 7,363,720 B2 * | 4/2008 | DiGavero et al. | 33/528 |
| 2003/0115767 A1 * | 6/2003 | Wedekind et al. | 33/566 |
| 2003/0190048 A1 * | 10/2003 | Mazejka et al. | 381/365 |
| 2003/0235323 A1 * | 12/2003 | Chuang | 381/386 |
| 2005/0011079 A1 * | 1/2005 | Sikora et al. | 33/566 |
| 2005/0217129 A1 * | 10/2005 | Boys | 33/528 |
| 2006/0231326 A1 * | 10/2006 | Iwayama et al. | 181/150 |
| 2007/0290112 A1 * | 12/2007 | Orth et al. | 248/317 |
| 2008/0078609 A1 * | 4/2008 | Struthers et al. | 181/150 |

FOREIGN PATENT DOCUMENTS

WO    WO 2004066670    *    8/2004

\* cited by examiner

UNIVERSAL INSTALLATION TEMPLATE AND METHOD OF USE FOR PLACEMENT OF IN-WALL OR IN-CEILING SPEAKERS

RELATED APPLICATIONS

The present non-provisional application claims the benefit of U.S. Provisional Patent Application No. 60/762,981, filed Jan. 26, 2006. The identified provisional application is incorporated herein by specific reference.

BACKGROUND OF THE INVENTION

1. Field of the Invention

Embodiments of the present invention generally relate to templates that may be mounted in a wall or ceiling during construction to facilitate installation of equipment, such as speakers. More specifically, embodiments of the present invention provide an installation template that is adjustable for placement of various sized equipment in a finished wall or ceiling.

2. Description of the Related Art

It is known in the construction industry to mount speaker templates to wall studs, install drywall over the studs and templates, and cut mounting apertures using the installed templates as a guide. Such templates facilitate speaker installation by precisely positioning mounting apertures, in which speakers may be installed, within the drywall. However, prior art templates are device dependent, requiring a different template to be utilized for each speaker size. A distributor, or a custom installer, must therefore stock several different sized templates to accommodate the various sized speakers that are typically installed in home and business environments. Thus, it is often difficult, or impossible, to utilize speaker templates for precise installation of varying sized speakers.

SUMMARY OF THE INVENTION

Embodiments of the present invention solve the above-described problems and provide a distinct advance in the art of in-wall templates. More particularly, various embodiments of the invention provide installation templates and methods that allow placement of various sized equipment in a finished wall or ceiling. Such a configuration allows varying-sized speakers and other in-wall equipment to be easily and accurately positioned.

In various embodiments, the present invention provides a method of forming an aperture for mounting of an in-wall component between two supports. The method generally includes coupling a substrate, including an adjustable guide corresponding to the dimensions of the in-wall component, to the two supports, installing drywall over the substrate and the guide, and forming the aperture by removing at least a portion of the drywall installed over the guide.

Other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of various embodiments of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning now to the drawing figures, and particularly FIGS. 1-14, an installation template 10 constructed in accordance with various preferred embodiments of the present invention is illustrated. As is discussed in more detail below, the template 10 is configured for installation between, across, or over at least two in-wall supports, such as wall studs or ceiling joists, to facilitate formation of an aperture 30 for mounting of an in-wall component, such as a speaker or speaker bracket, between the two supports.

The template 10 broadly includes a substrate 12 operable to be coupled with the two supports and an adjustable guide 14 operable to be adjusted to correspond to the dimensions of the in-wall component. The adjustable guide 14 is also operable to be coupled with the substrate 12 to allow proper formation of the aperture 30.

The substrate 12 may comprise any material or combination of materials operable to span between at least two supports and support the guide 14. Preferably, the substrate 12 is comprised of a material that allows it to be easily stapled, nailed, screwed, glued, or otherwise fastened to the supports during construction of a wall or ceiling. Thus, in various embodiments, the substrate 12 is preferably comprised of paper, such as corrugated cardboard or pulp fiber board, having sufficient rigidity to retain the guide 14 while being sufficiently thin to not undesirably create waves in, or show through, drywall that may be installed over the substrate 12. However, as should be appreciated by those skilled in the art, the substrate 12 may be formed of any material, including plastic, metal, wood, etc.

Additionally, the substrate 12 preferably incorporates a simple, cost-effective construction. The substrate 12 can be formed in a rotary cut die, stamped, or the like. In this regard, the substrate 12 is preferably formed from paper, such as the corrugated cardboard or pulp fiber board discussed above.

The substrate 12 is preferably wide enough to span at least two wall studs positioned sixteen-inches apart and high enough to allow housing of the largest industry standard speaker diameter and/or width. More preferably, the substrate 12 has a width that is sufficient to span at least two wall studs positioned twenty-four inches apart. Thus, in various embodiments, the substrate 12 has a width between approximately seventeen inches and twenty-six inches and a height between approximately seven and sixteen inches. More preferably, the substrate 12 has a width of approximately twenty-five inches and a height of approximately fifteen inches.

In various embodiments, the substrate 12 includes a plurality of mounting holes 16 to facilitate coupling with the guide 14. The mounting holes 16 preferably include various holes, slits, perforations, gaps, etc., formed within the substrate 12 that correspond to various portions of the guide 14, as is discussed in more detail below. The mounting holes 16 do not necessarily extend through the entire substrate 12, as the mounting holes 16 may be partial perforations that may receive only a portion of the guide 14. Further, in some embodiments the mounting holes 16 may be partial perforations that are operable to be fully perforated by the guide 14 when installed by a user.

As is also discussed in more detail below, the substrate 12 may include sizing indicia 18 imprinted thereon to facilitate adjustment of the guide 14. The sizing indicia 18 may indicate how to adjust the guide 14 to correspond to the dimensions of the speaker or other in-wall component. Preferably, the sizing indicia 18 correspond to the plurality of mounting holes 16 such that the guide 14 is operable to be adjusted and coupled to the substrate 12 by inserting portions of the guide 14 within at least one of the mounting holes 16.

For instance, the sizing indicia 18 may include a plurality of indicators, such as letters, that each correspond to an industry-standard speaker size. For instance, the indicators may correspond to speaker sizes as illustrated in the following table:

TABLE 1

| INDICATOR | DIAMETER (inches) |
| --- | --- |
| A | 11¼ |
| B | 10½ |
| C | 10 |
| D | 9½ |
| E | 9 |
| F | 8/18 |
| G | 8 |
| H | 7½ |
| I | 7 |
| J | 6½ |
| K | 6 |

The sizing indicia 18 may correspond to the mounting holes 16 by being positioned in proximity to each of the holes 16. For instance, in embodiments where the sizing indicia 18 include the indicators A-K corresponding to eleven different speaker sizes, each of the holes 16 may have one of the indicators positioned nearby to allow easy installation and adjustment of the guide 14.

Figure 1:
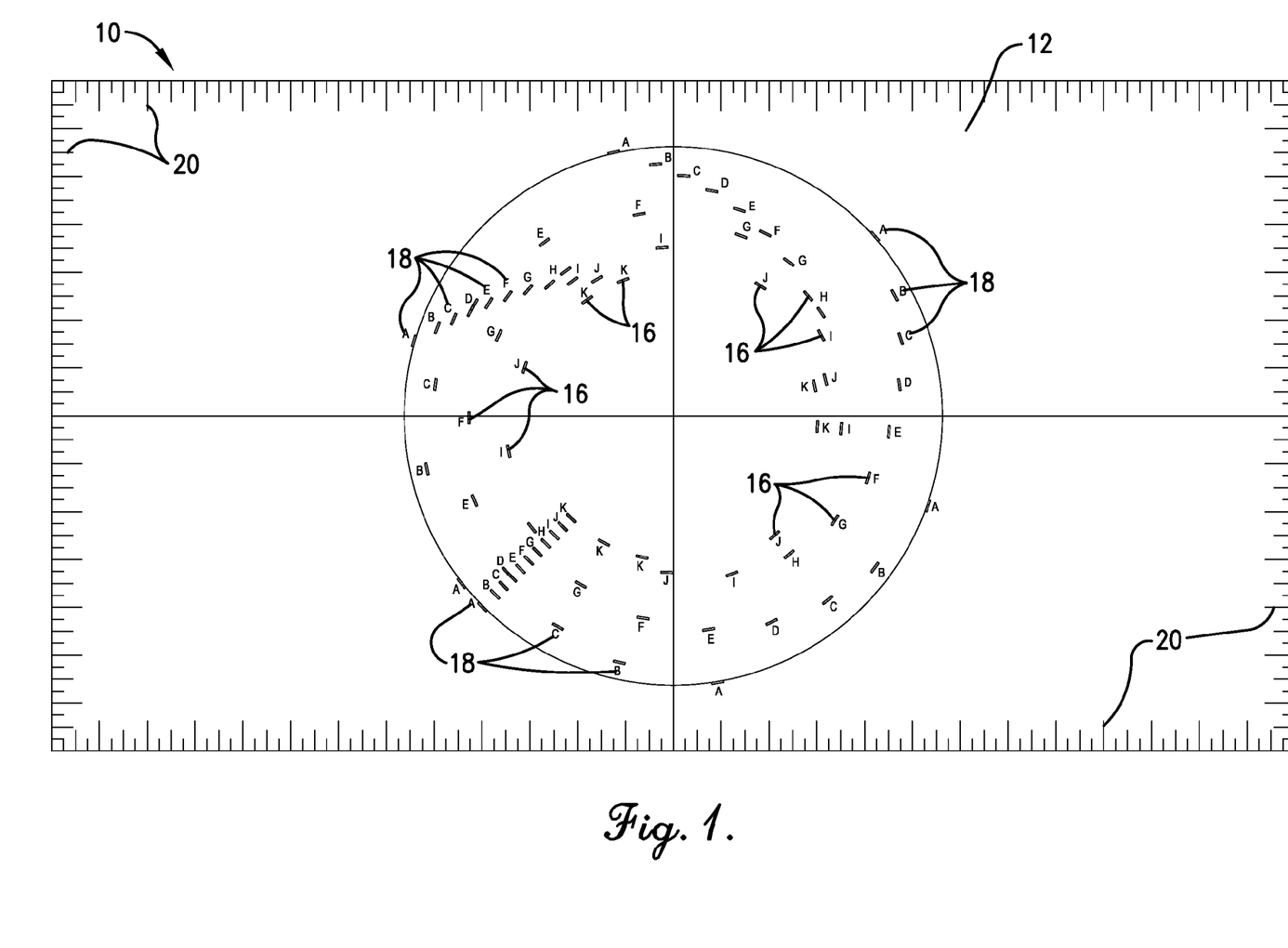
FIG. 1 is a front view of an installation template configured in accordance with various preferred embodiments of the present invention.

For instance, in some embodiments the plurality of mounting holes 16 may include with seven holes corresponding to each of the eleven indicators A-K, as is shown in FIG. 1. However, as should be appreciated, the sizing indicia 18 may present any configuration or appearance to assist adjustment or coupling of the guide 14. For example, various guide configurations may require varying numbers of mounting holes 16 and sizing indicia 18. Further, embodiments that provide fewer than the eleven exemplary speaker sizes may include fewer mounting holes 16 while embodiments that provide more than the eleven exemplary speaker sizes may include a greater number of mounting holes 16. Thus, the mounting holes 16, in combination with the guide 14, may be configured to correspond to any desired in-wall component size.

Figure 8:
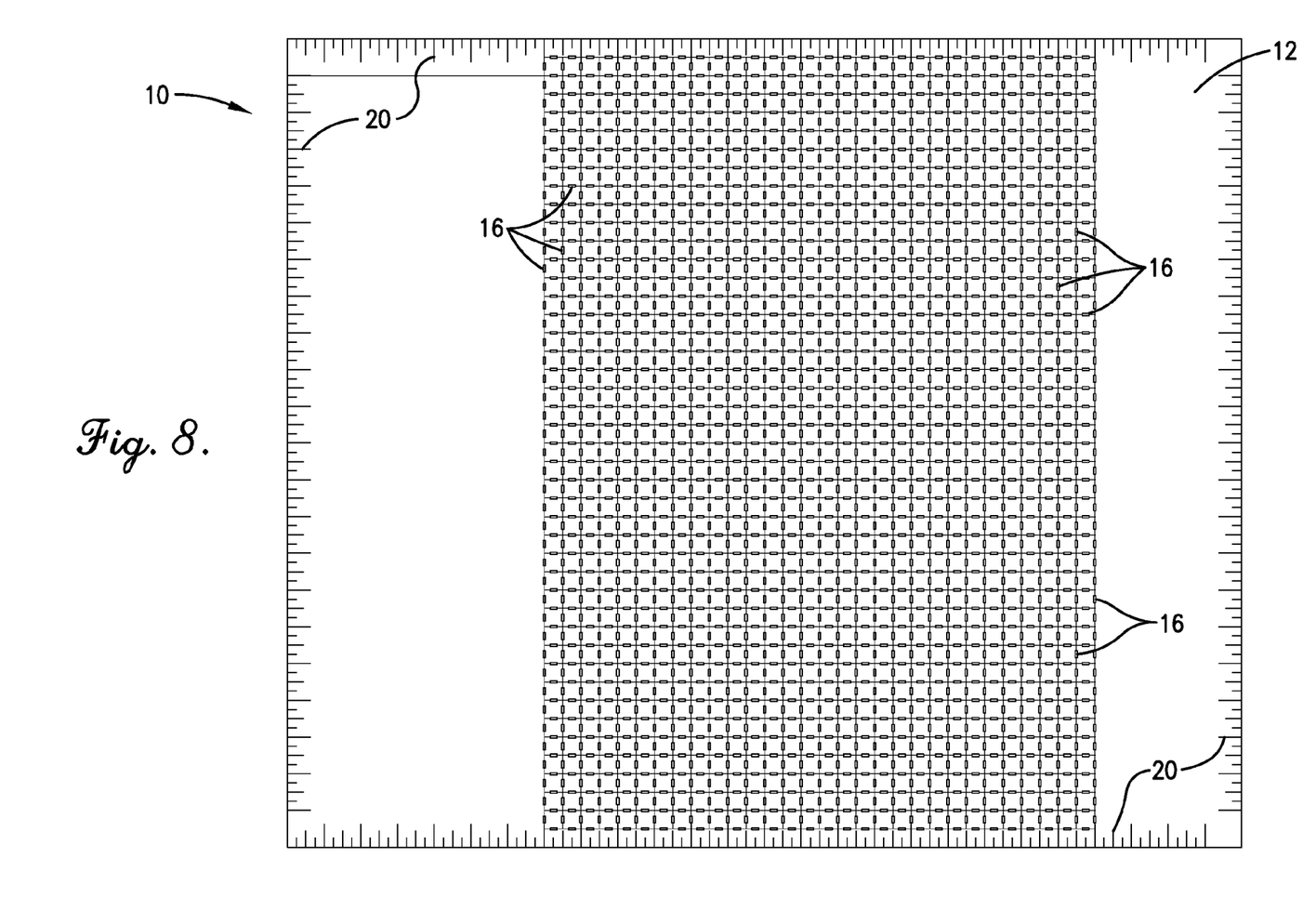
FIG. 8 is a front view of an installation template configured in accordance with various other preferred embodiments of the present invention.
Figure 9:
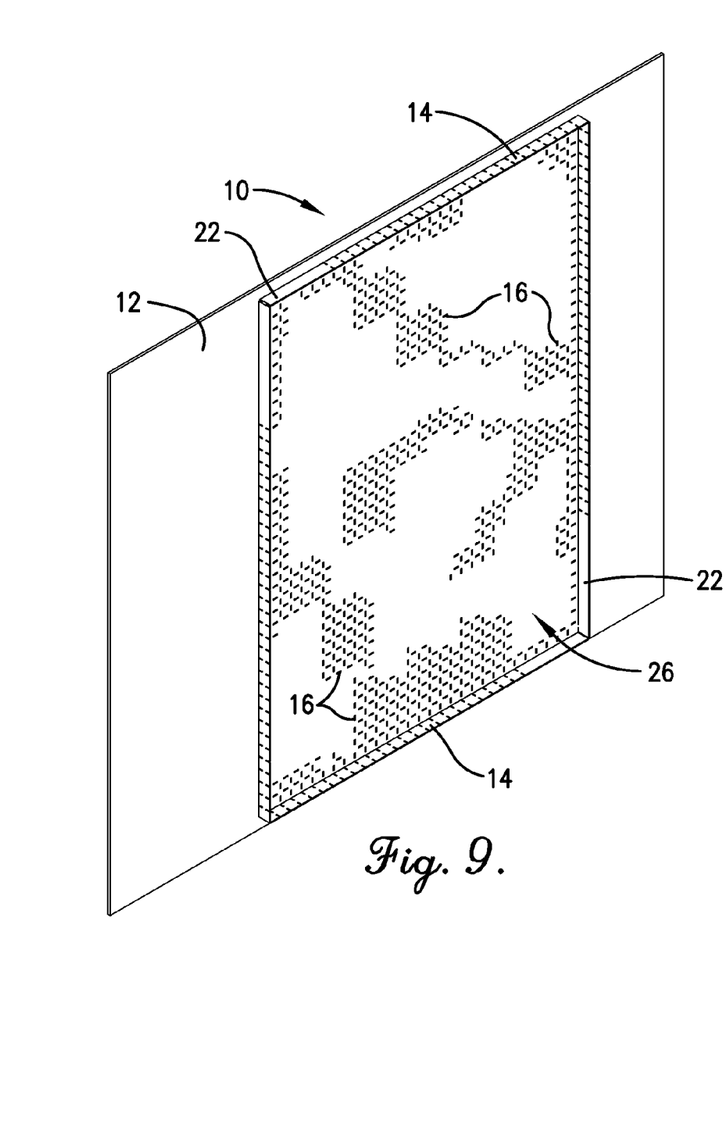
FIG. 9 is a perspective view of the template of FIG. 8, the template shown including a guide coupled to a substrate.
Figure 10:
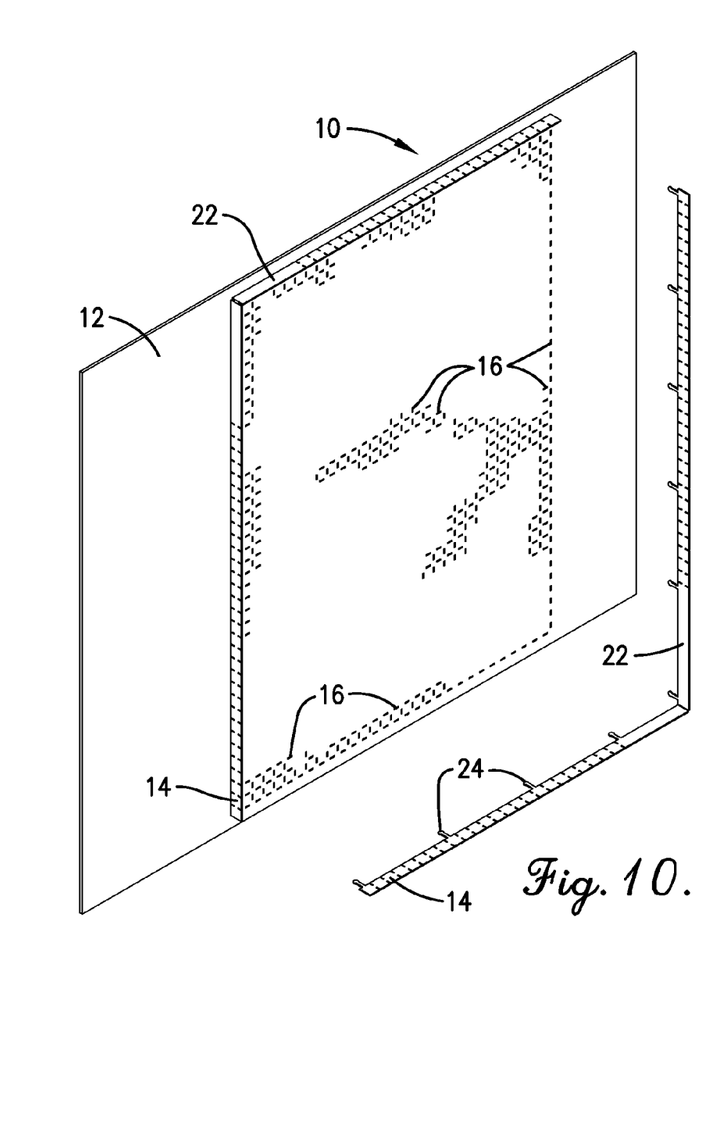
FIG. 10 is another perspective view of the template, guide, and substrate of FIG. 9.

In various embodiments, the template 10 is operable to present mounting holes 16 configured in generally circular patterns, as shown in FIG. 1, and/or generally rectangular patterns, as shown in FIG. 8. Thus, the mounting holes 16 may be distributed across the substrate 12 to present a rectangular grid-like pattern and/or distributed across the substrate 12 to present a circular spiral-like pattern. Such configurations enable the template 10 to easily form both circular and rectangular apertures for receiving in-wall components.

The grid-like pattern formed by the mounting holes 16 in various embodiments of the present invention may provide a grid area having a width between approximately seventeen inches and twenty-four inches and a height between approximately seven and sixteen inches, with one of the mounting holes 16 mounted every one-half inch, as is shown in FIG. 8. More preferably, the grid area formed by the mounting holes 16 has a height of approximately twenty inches and a width of approximately fifteen inches.

The substrate 12 also preferably includes rule marks 20 along at least one of its edges to facilitate coupling of the substrate 12 to the supports and proper alignment of the formed aperture 30. For example, the rule marks 20 may include eighth, quarter, half, inch, and foot markings positioned along the vertical and horizontal edges of the substrate 12. However, as should be appreciated, the rule marks 20 may indicate metric measurements and/or be positioned anywhere on the substrate 12. In various embodiments, the substrate 12 also preferably includes installation instructions imprinted thereon to facilitation installation of the template 10.

The guide 14 is operable to be adjusted to correspond to the dimensions of the speaker, or other desired in-wall component, and coupled to the substrate 12. Preferably, the guide 14 couples with the substrate 12 through positioning of a portion of the guide 14 within or through at least one of the mounting holes 16. The guide 14 may be coupled with selected mounting holes 16, as indicated by the sizing indicia 18 for example, to corresponding to any sized in-wall component.

In various embodiments, the guide 14 preferably comprises a pliable strip of metal 22 including a plurality of protrusions 24 extending from its longitudinal axis. Each of the protrusions 24 are operable to be inserted in one of the mounting holes 16 discussed above. The protrusions 24 may present any configuration operable to mate with the substrate 12 or otherwise be coupled with the mounting holes 16.

Figure 2:
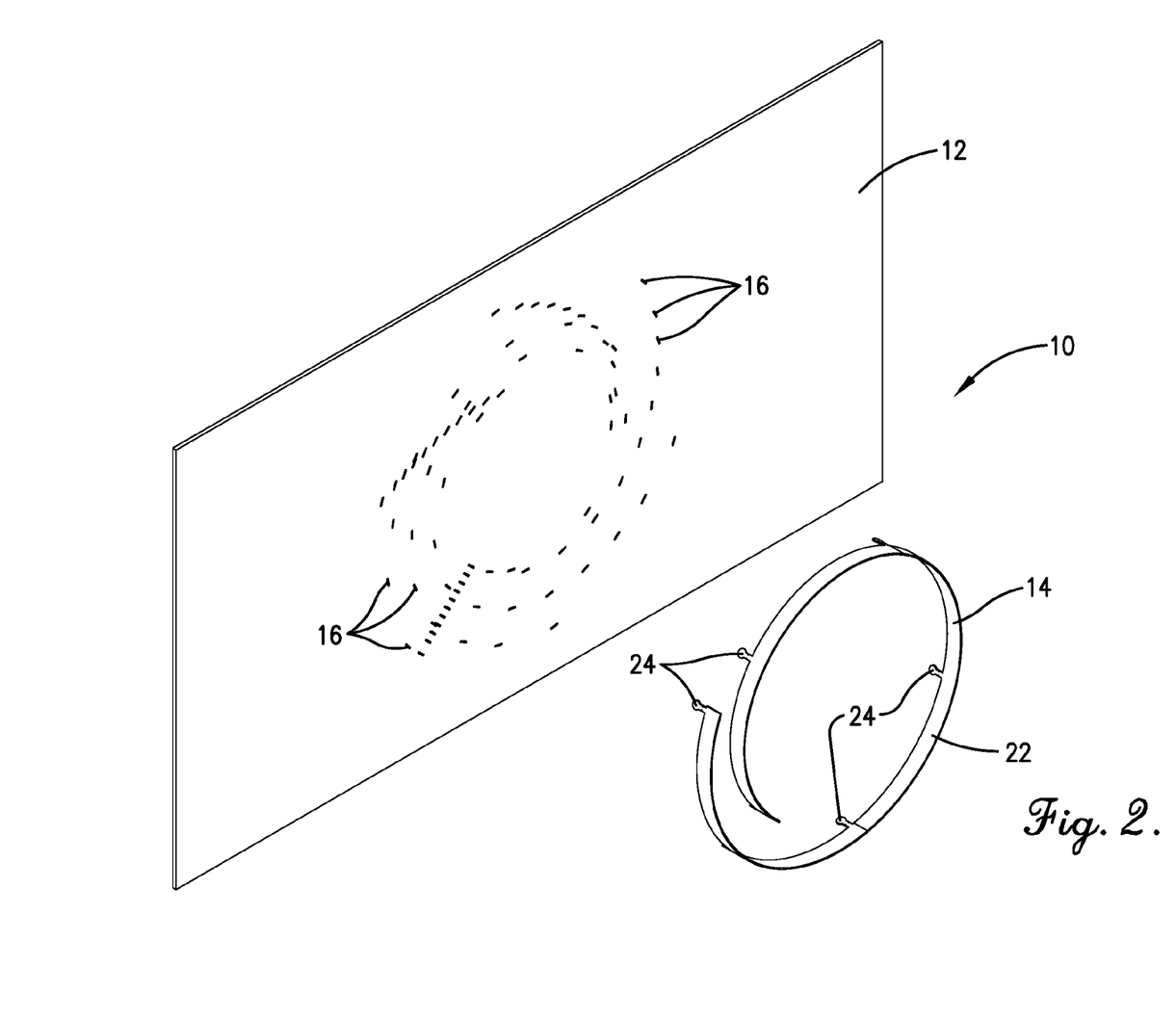
FIG. 2 is a front perspective view of a substrate and guide that may comprise portions of the installation template of FIG. 1.
Figure 4:
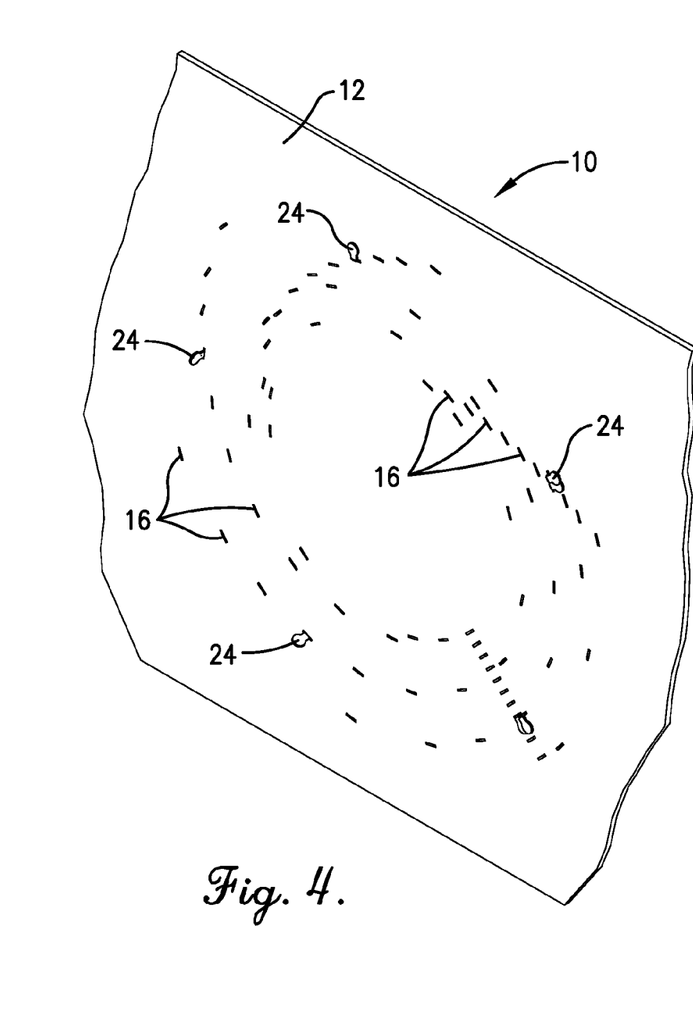
FIG. 4 is a rear perspective view of the guide coupled to the substrate.

For example, the protrusions 24 may present a tab-like configuration, as shown in FIGS. 2 and 4, such that each of the protrusions 24 is operable to be inserted through one of the mounting holes 16 and folded against the back of the substrate 12 to secure the guide 14 thereto. However, the protrusions 24 may present any configuration operable to be at least partially inserted into the mounting holes 16 or substrate, including pointed, hooked, and curved configurations.

Figures 11, 12:
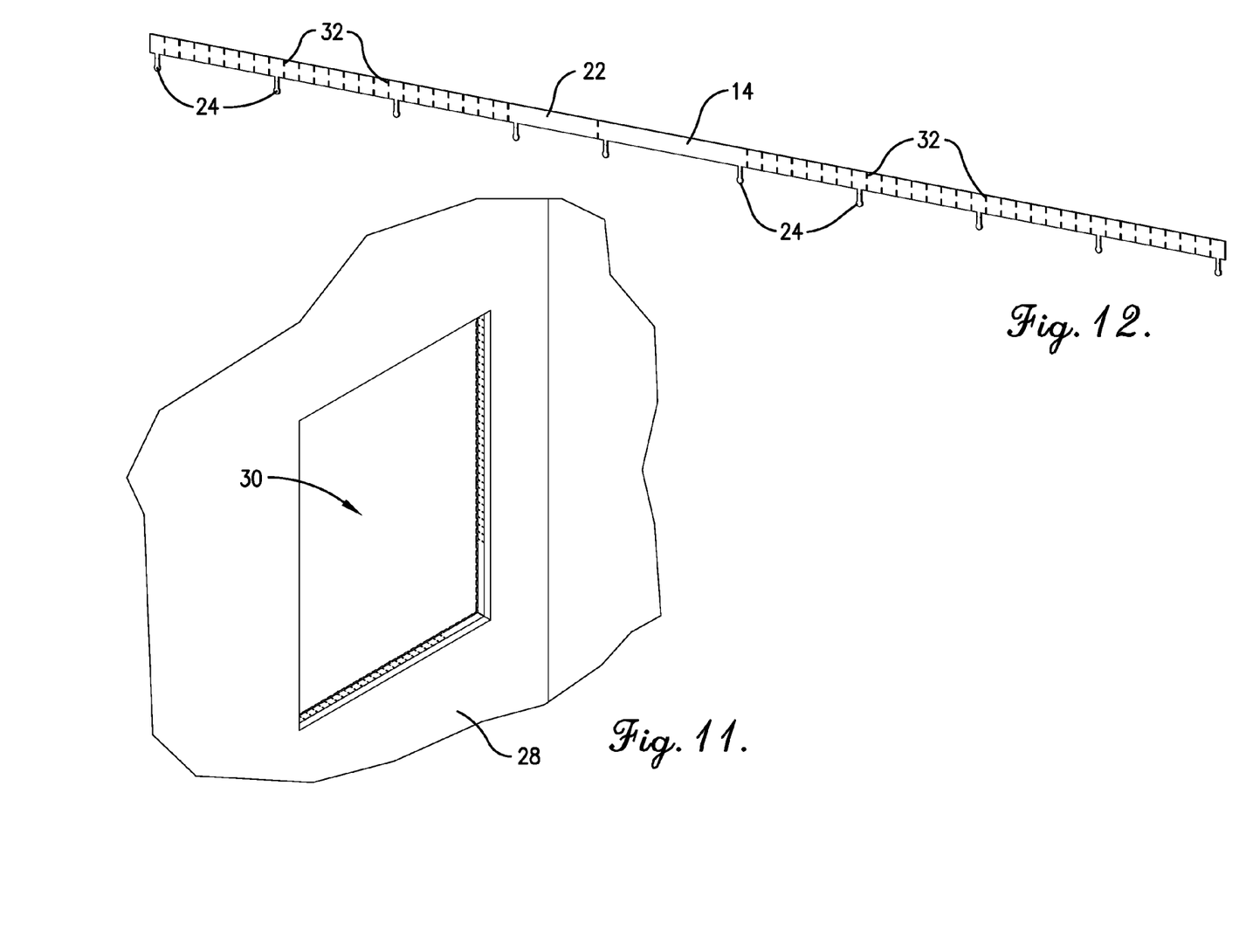
FIG. 11 is a perspective view of an aperture formed after installation of drywall over at least a portion of the template of FIG. 9.
FIG. 12 is a perspective view of the guide of FIGS. 9-10.
Figure 13:
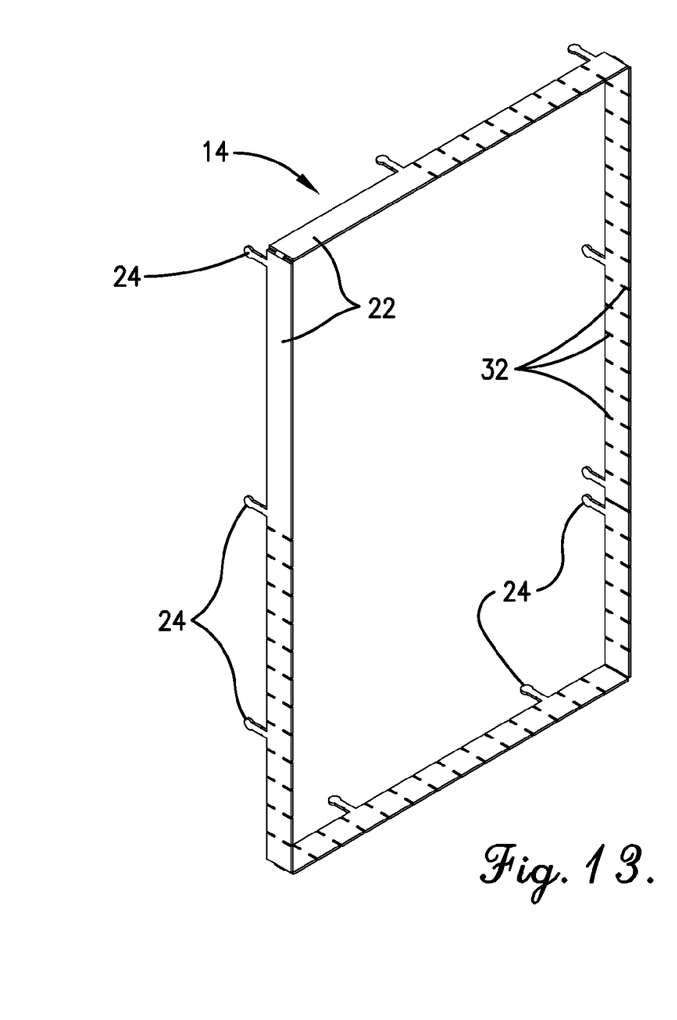
FIG. 13 is another perspective view of the guide of FIGS. 9-10 and 12, the guide shown bent and coupled with another similarly-configured guide to form a generally square area.
Figure 14:
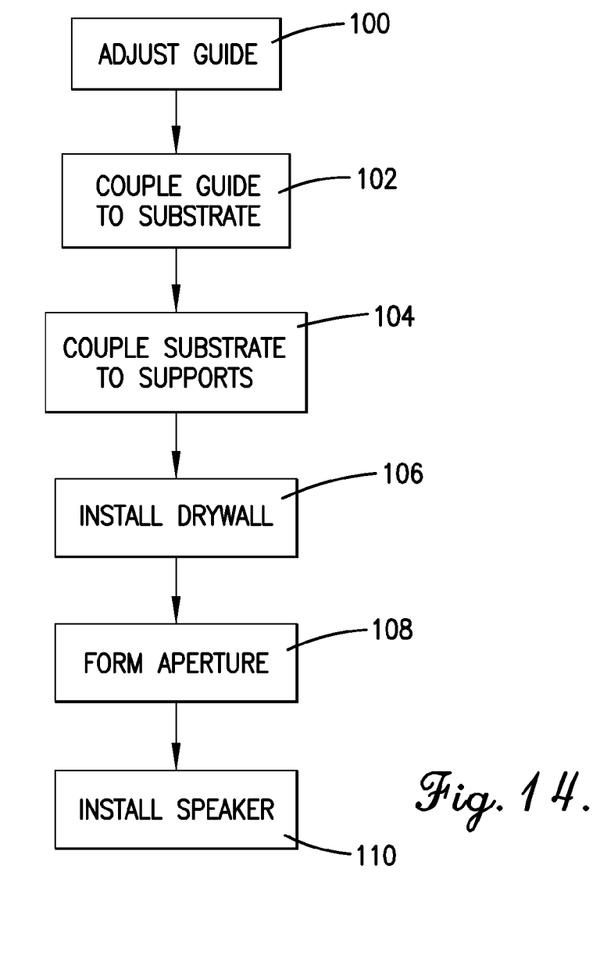
FIG. 14 is a flow chart showing some of the steps that may be performed by various embodiments of the present invention.

In some embodiments, the strip of metal 22 may be initially curved or coiled to facilitate the formation of circular apertures with the guide 14. For instance, as shown in FIG. 2, the strip of metal 22 may be partially coiled to enable the user to easily align the protrusions 24 and mounting holes 16. In other embodiments, as shown in FIG. 12, the strip of metal 22 may initially present a non-coiled configuration to facilitate the formation of rectangular apertures with the guide 14. In such embodiments, the strip of metal 22 preferably includes bend points 32, such as notches or perforations formed in or on the strip of metal 22, to enable users to easily bend the strip of metal 22 into a desired rectangular configuration. To facilitate the formation of large rectangular apertures, the guide 14 may be formed from two or more strips of metal 22, as is shown in FIG. 13.

Additionally or alternatively, the guide 14 may include slidable or repositionable elements to form desired circular and rectangular configurations. For example, the guide 14 may include telescoping and/or interlocking portions to enable its shape and configuration to be readily adapted to any desired configuration. For example, in some embodiments the two strips of metal 22 shown in FIG. 13 may be slidably interconnected.

The guide 14 is preferably formed from about twenty gage steel to present a rigid configuration operable to withstand cutting, as is discussed in more detail below. However, the guide 14 may be formed from any material, including other metals, nylon, ABS plastic, injected molded plastic, and the like.

Figures 5, 6, 7:
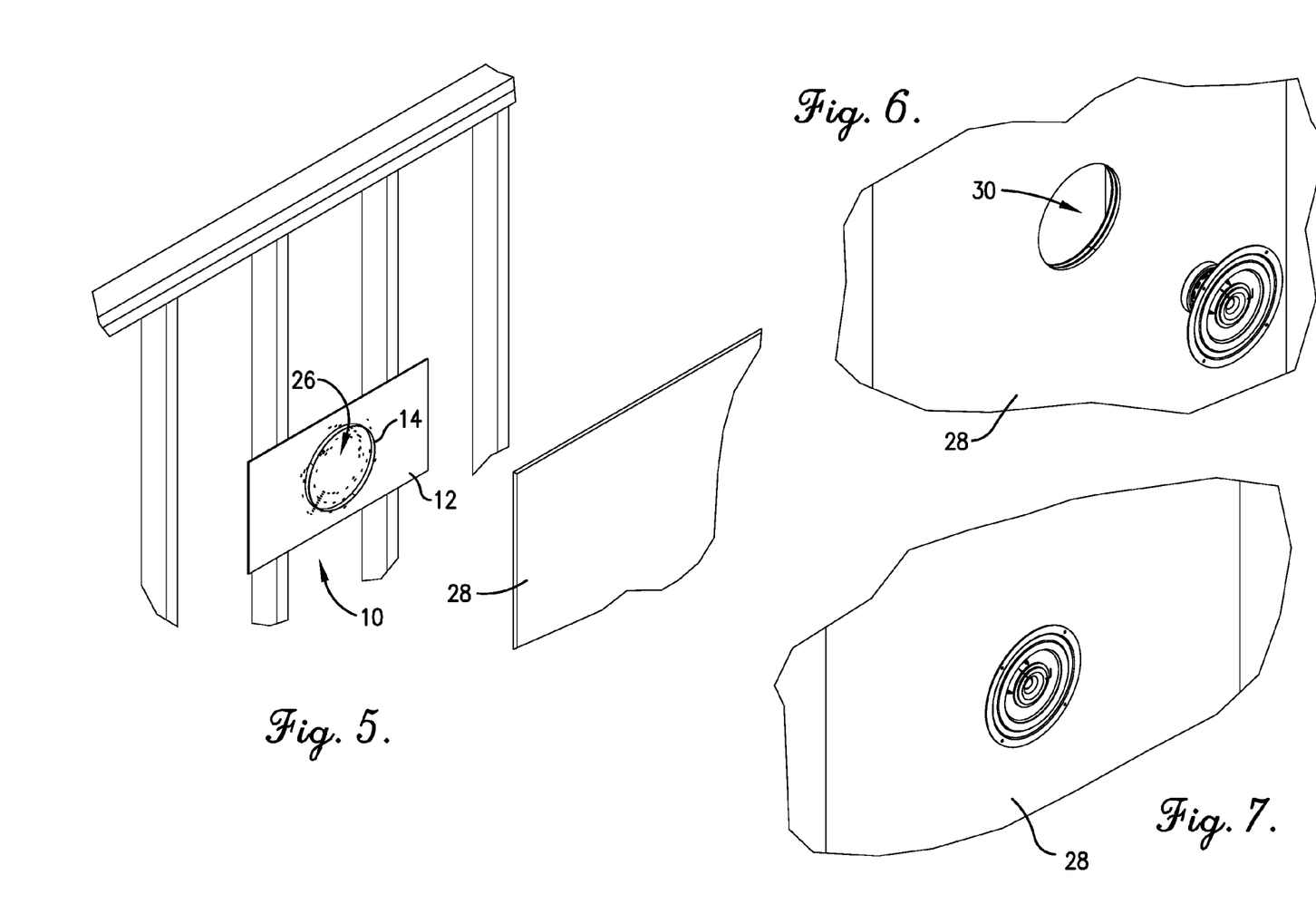
FIG. 5 is a perspective view showing the template and guide of FIGS. 1-2 coupled to two supports.
FIG. 6 is a perspective view showing an aperture formed after installation of drywall over at least a portion of the template of FIG. 5.
FIG. 7 is a perspective view showing a speaker mounted in the aperture of FIG. 6.

FIG. 6 generally illustrates various methods that may be performed by embodiments of the present invention. Steps 100-110 generally include: adjusting the guide 14, referenced at step 100; coupling the guide 14 to the substrate 12, referenced at step 102; coupling the substrate 12 to supports, referenced at step 104; installing drywall over at least a portion of the template 10, referenced at step 106; forming an aperture in the drywall, referenced at step 108; and installing an in-wall component within the aperture, referenced at step 110.

Steps 100-110 may be performed in any order and are not limited to the specific order described herein. Additionally, steps 100-110 may be performed simultaneously or concurrently such that the steps are not necessarily sequential. Further, steps 100-110 are not each necessarily performed by all embodiments of the present invention.

In step 100, the guide 14 is adjusted to correspond to the dimensions of the desired in-wall component, such as a speaker. As discussed below, in some embodiments step 100 may be performed in combination with step 102 such that the guide 14 is adjusted by coupling the guide 14 to the substrate 12.

However, in some embodiments the guide 14 may be adjusted before coupling to the substrate 12. For example, the guide 14 may be adjusted by manually bending the guide 14 into a desired shape and/or utilizing slidable or repositionable elements discussed above. The guide 14 may also be adjusted by cutting a portion of the guide 14 to present a desired size. Further, the guide 14 may be partially adjusted in step 100, such as by aligning the protrusions 24 provided by the guide 14 with selected mounting holes 16, to facilitate coupling of the guide 14 and substrate in step 102.

In step 102, the guide 14 is coupled to the substrate 12. In some embodiments, steps 100 and 102 may be performed generally simultaneously such that the guide 14 is adjusted to the desired size through coupling with the substrate 12. For example, in some embodiments the guide 14 may be adjusted and coupled to the substrate 12 through insertion of at least one of the protrusions 24 within at least one of the mounting holes 16. Specifically, a user may adjust and couple the guide 14 to the substrate 12 by inserting protrusions 24 within the mounting holes 16 according to the sizing indicia 18. For example, if the speaker to be installed corresponds to size A, the user may insert the protrusions 24 within the mounting holes 16 having an A marked nearby.

In embodiments where the guide 14 is adjusted before coupling to the substrate 12, the guide 14 may be coupled with the substrate 12 utilizing the protrusions 24 or any conventional fastening elements. For instance, the guide 14 may be coupled to the substrate 12 utilizing adhesives, staples, nails, screws, bolts, and/or any mating connectors. In embodiments where the substrate 12 substantially comprises cardboard or other malleable materials, the guide 14 may be coupled with the substrate 12 by forcing a portion of the guide 14 into or through the substrate 12.

Further, in some embodiments the guide 14 may be coupled with the substrate 12 and then adjusted to the desired size. For example, as discussed above, the guide 14 may include slidable and repositionable elements that may be adjusted to present a desired size or configuration after the guide 14 is coupled with the substrate 12.

Figure 3:
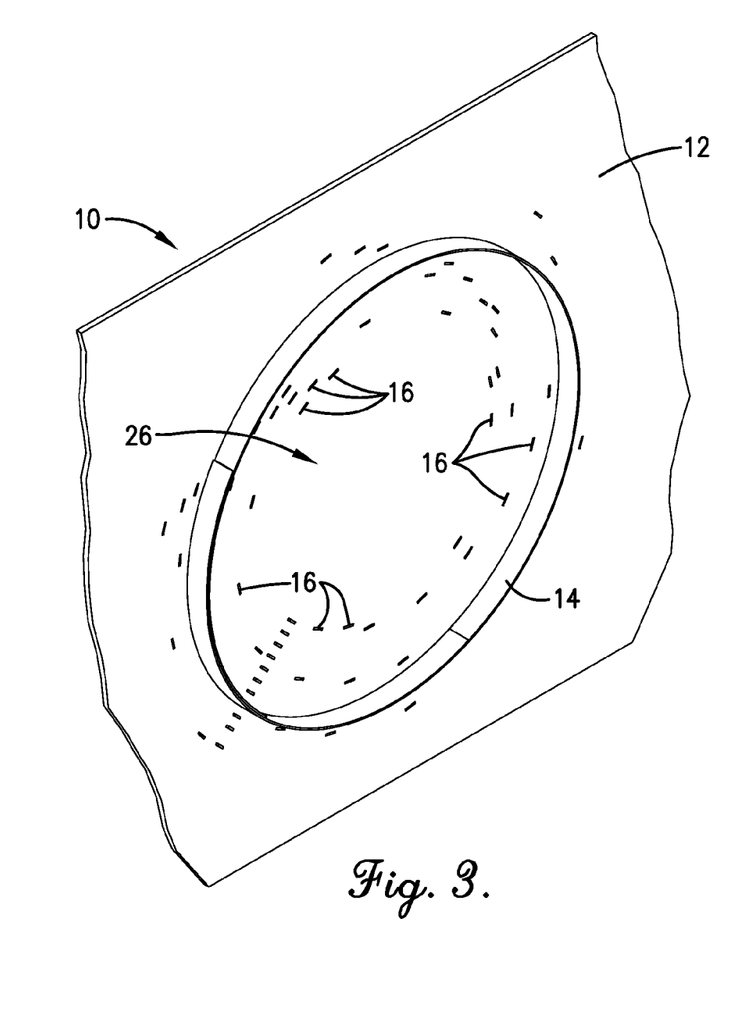
FIG. 3 is a front perspective view of the guide coupled to the substrate.

The coupling of the guide 14 to the substrate 12 forms an enclosed area 26 generally corresponding to the dimensions of the desired in-wall component. For example, the enclosed area 26 may have an area substantially corresponding to the area required to mount, retain, or enclose the in-wall component or mounting hardware for the in-wall component. The perimeter of the enclosed area 26 is preferably defined by the position of the guide 14 such that the guide 14 substantially envelops the enclosed area 26, as shown in FIG. 3. However, in some embodiments the perimeter of the enclosed area 26 may include gaps or other portions not abutted by the guide 14 such that the guide 14 does not necessarily envelop the enclosed area 26.

In step 104, the substrate 12 is coupled to at least one support. The support is preferably a wall stud or a ceiling joist, but the support may be any wall or ceiling element over which drywall may be installed. In various embodiments, the substrate 12 is coupled with at least two supports to span the distance therebetween.

The substrate 12 may be coupled with the supports utilizing any fastening or connecting elements, including utilizing adhesives, staples, nails, screws, bolts, and/or any other fasteners. Preferably, the substrate 12 is coupled with the supports utilizing staples to enable the substrate 12 to be rapidly and easily mounted.

In embodiments where the substrate 12 includes the rule marks 20, the substrate 12 may be accurately aligned and coupled to the substrate 12 to ensure proper placement of the aperture 30 and in-wall component by measuring distances using the rule marks 20. The inclusion of the rule marks 20 on the substrate 12 additionally facilitates installation as the user is not required to have a free hand to wield a tape measure or ruler, and may instead utilize one hand to accurately position the substrate 12 and the other hand to function a staple gun or other fastening element to couple the substrate 12 to the supports.

In step 106, drywall 28 is installed over at least a portion of the template 10. Drywall 28, as utilized herein, generally refers to wallboard, gypsum board, GWB, plasterboard, SHEETROCK®, Gyproc®, or any other building material comprising a gypsum sheet sandwiched between two pieces of heavy paper. As should be appreciated, various embodiments of the present invention may employ covering materials other than drywall, as any material that may cover at least a portion of the template 10 and be cut to form the aperture 30 may be utilized.

The drywall 28 is preferably installed to the same supports to which the substrate 12 is attached such that the enclosed area 26 formed by the guide 14 is entirely covered by the drywall 28. The drywall 28 may be affixed to the supports, or any other supports comprising the wall or ceiling in which it is desired to form the aperture 30, utilizing conventional fastening methods.

In step 108, the aperture 30 is formed in the drywall 28. The aperture 30 may be formed by removing a portion of the drywall 28 that covers the enclosed area 26 provided by the guide 14. In particular, the user may form the aperture 30 by inserting a cutting device through the drywall 28 and into the enclosed area 26 to remove at least a portion of the drywall 28 covering the enclosed area 26.

For example, the user may plunge a drywall knife or saw through the drywall 28 covering the center portion of the enclosed area 26 and into or through the substrate 12. The user many then saw or cut through the substrate 12 and drywall 28 until the saw or knife reaches the guide 14. The rigid construction of the guide 14 enables the guide 14 to withstand contact by the saw or blade and alert the user to presence of the guide 14. After contacting the guide 14, the user may cut along the guide 14 and remove the cut drywall 28 and substrate 12 to form the aperture 30 with dimensions corresponding to those defined in steps 100 and/or 102.

The aperture 30 may be formed utilizing other cutting devices or cutting methods instead of, or in addition to, the drywall knife and saw discussed above. For example, the aperture 30 may be formed by breaking portions of the drywall 28 covering the enclosed area 26 and removing broken drywall 28 and substrate 12 to form the aperture 30.

In step 110, the in-wall component is installed or otherwise positioned within the aperture 30. The in-wall component may be installed within the aperture 30 utilizing conventional installation equipment and methods. In some embodiments, mounting and electrical hardware may first be installed within or behind the aperture 30 or drywall 28 to enable equipment to be properly configured and secured. The in-wall component may be a speaker or speaker bracket, as discussed above, or any other component that may be mounted within a wall or ceiling. Thus, the mounted in-wall component may comprise speakers, televisions, computing devices, electronic equipment, lights, windows, frames, combinations thereof, and the like.

Steps 100 through 110 may be repeated with additional templates 10 to accurately position a plurality of apertures within a wall or ceiling. Further, in some embodiment the template 10 may include a plurality of guides to enable a plurality of apertures to be formed utilizing only one template.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of forming an aperture for mounting of a speaker between two supports, the method comprising:
   (a) adjusting a guide to correspond to the dimensions of the speaker;
   (b) coupling the guide to a substrate;
   (c) coupling the substrate to the two supports;
   (d) installing drywall over the substrate and the guide; and
   (e) forming the aperture by removing at least a portion of the drywall installed over the guide.

2. The method of claim 1, further including:
   (f) mounting the speaker at least partially within the aperture.

3. The method of claim 1, wherein the adjusted guide forms an enclosed area and the aperture is formed by removing at least a portion of the installed drywall covering the enclosed area.

4. The method of claim 3, wherein the aperture is formed by inserting a cutting device through the installed drywall and into the enclosed area to remove at least a portion of the drywall covering the enclosed area.

5. The method of claim 3, further including:
   (f) mounting the speaker at least partially within enclosed area.

6. The method of claim 1, wherein the substrate includes a plurality of mounting holes and the guide is adjusted and coupled to the substrate by positioning a portion of the guide within at least one of the mounting holes.

7. The method of claim 1, wherein the guide is adjusted to form generally circular enclosed area.

8. The method of claim 1, wherein the guide is adjusted to form a generally rectangular enclosed area.

9. An installation template to form an aperture for mounting of a speaker between two supports, the template comprising:
   a substrate including a plurality of mounting holes, the substrate operable to be coupled with the two supports; and
   an adjustable guide operable to be adjusted to correspond to the dimensions of the speaker and coupled to the substrate by positioning a portion of the guide within at least one of the mounting holes.

10. The template of claim 9, wherein the guide is operable to be adjusted to form an enclosed circular area having a circumference between approximately six and twelve inches.

11. The template of claim 9, wherein the guide is operable to be adjusted to form an enclosed rectangular area having a width between twelve and eighteen inches and a height between seventeen and twenty-three inches.

12. The template of claim 9, wherein the substrate has a width between approximately seventeen inches and twenty-four inches and a height between approximately seven and sixteen inches.

13. The template of claim 9, wherein the substrate is a cardboard substrate.

14. The template of claim 9, wherein the guide comprises a pliable strip of metal including a plurality of protrusions extending away from its longitudinal axis, each of the protrusions operable to be inserted into one of the mounting holes.

15. The template of claim 9, wherein the substrate includes a plurality of sizing indicia imprinted thereon to facilitate adjustment of the guide.

16. The template of claim 15, wherein the sizing indicia correspond to the plurality of mounting holes such that the guide is operable to be adjusted and coupled to the substrate by inserting the portion of the guide within at least one of the mounting holes.

17. An installation template to form an aperture for mounting of a speaker between two supports, the template comprising:
a cardboard substrate including a plurality of mounting holes and operable to be coupled with the two supports; and
a guide operable to be coupled to the substrate by positioning a portion of the guide within at least one of the mounting holes.

18. The template of claim 17, wherein the guide comprises a pliable strip of metal including a plurality of protrusions extending away from its longitudinal axis, each of the protrusions operable to be inserted into one of the mounting holes.

19. The template of claim 17, wherein the guide is operable to be adjusted to correspond to the dimensions of the speaker.

20. The template of claim 17, wherein the substrate includes a plurality of sizing indicia imprinted thereon to facilitate adjustment of the guide.

* * * * *